United States Patent [19]

Mayginnes

[11] Patent Number: 5,031,232
[45] Date of Patent: Jul. 9, 1991

[54] METHOD AND APPARATUS FOR PROVIDING AN OPERATING MODE ALIAS TO A RADIO

[75] Inventor: Kevin B. Mayginnes, Fort Worth, Tex.

[73] Assignee: Motorola, Inc., Schaumburg, Ill.

[21] Appl. No.: 438,298

[22] Filed: Nov. 16, 1989

[51] Int. Cl.$^5$ ............................................. H04B 17/00
[52] U.S. Cl. ..................................... 455/67; 455/186
[58] Field of Search ................... 455/89, 90, 185, 186, 455/67, 226, 68–70

[56] References Cited

U.S. PATENT DOCUMENTS

| | | | |
|---|---|---|---|
| 4,525,865 | 6/1985 | Meas | 455/186 |
| 4,792,986 | 12/1988 | Garner | 455/186 |
| 4,843,588 | 6/1989 | Flynn | 455/186 |
| 4,927,789 | 5/1990 | Shirley, Jr. et al. | 455/186 |

*Primary Examiner*—Curtis Kuntz
*Attorney, Agent, or Firm*—Steven G. Parmelee

[57] ABSTRACT

A radio programming device (100) that allows for operating mode information (Table 2) as preprogrammed in a radio (101) to be accessed and compared against a mode name alias data base (Table 1). When matches are found, the appropriate mode name alias is provided to the radio, and the radio stores it and uses it thereafter when operating in the corresponding operating mode.

3 Claims, 2 Drawing Sheets

FIG.3

MODE NAME ALIAS DATABASE

| MODE NAME ALIAS | TRANSMIT FREQUENCY | RECEIVE FREQUENCY | SYSTEM I.D. | SUBFLEET |
|---|---|---|---|---|
| NORTH WEST | 5 | 4 | 3 | 1 |
| NORTH | 3 | 7 | 3 | 2 |
| SOUTH WEST | 6 | 8 | 2 | 1 |
| SOUTH | 10 | 11 | 2 | 2 |
| WEST | 2 | 9 | 3 | 3 |
| EAST | 1 | 12 | 4 | 1 |

FIG.4

PREDETERMINED RADIO OPERATING MODES

| OPERATING MODE | TRANSMIT FREQUENCY | RECEIVE FREQUENCY | SYSTEM I.D. | SUBFLEET |
|---|---|---|---|---|
| 1 | 1 | 12 | 4 | 1 |
| 2 | 10 | 11 | 2 | 2 |
| 3 | 15 | 17 | 4 | 2 |
| 4 | 5 | 4 | 3 | 1 |
| 5 | 2 | 9 | 3 | 3 |
| 6 | 3 | 7 | 3 | 2 |
| 7 | 6 | 8 | 2 | 1 |
| 8 | | | | |
| 9 | | | | |
| 10 | | | | |

METHOD AND APPARATUS FOR PROVIDING AN OPERATING MODE ALIAS TO A RADIO

TECHNICAL FIELD

This invention relates generally to radios, and more particularly to radios having a plurality of operating modes, wherein at least some of the operating modes have a displayable alias associated therewith.

BACKGROUND OF THE INVENTION

Communication radios, such as the SPECTRA brand two-way land mobile radio (manufactured and sold by Motorola, Inc., 5555 Beach Street, Fort Worth, Tex.) are becoming increasingly sophisticated, and offer the user a wide variety of operating capabilities. These various capabilities are typically controlled within the radio through manipulation and/or provision of various radio operating parameters. A non-exclusive list of such parameters would include transmit frequency, receive frequency, a system identification (ID), a subfleet ID (and other forms of squelch control and/or communication resource allocation mechanisms), encryption coding or decoding information, data message information, and so forth. Further, some radios will support various operating modes, wherein each mode has associated therewith a plurality of predetermined radio operating parameters. For example, a first predetermined operating mode for a given radio might require the radio to operate on a specified transmit and receive frequency, and to operate with a specific system ID and subfleet ID. A different operating mode for the same radio may provide for completely different values for the same operating parameters.

To simplify operation of the radio, such operating modes are preprogrammable, such that a full set of predetermined operating parameters can be selected by simply selecting a particular operating mode. To assist the user, a radio having a display will usually provide a mode name alias on the display to indicate to the user the particular mode then currently selected. Often, the alias will simply read, "mode 1," "mode 2, " and so forth.

In a large communication system, such as a bus fleet in a large metropolitan area, it is not unlikely that different radio equipped vehicles will be used by different operators from time to time. Therefore, it is not appropriate that the mode name aliases programmed into the radio should be too personalized to a particular user, as this would inhibit ease of use of the radio by a new operator unfamiliar with the definition of the private alias. By the same token, the generic alias otherwise provided by the radio (mode 1, mode 2, etc.) will also typically be unsuitable, since mode 1 for one radio will typically not coincide with mode 1 for a different radio, even within the same fleet.

In such a situation, it is desirable to provide a common system wide mode name alias for a given operating mode that will be readily recognized and understood by most or all operators within the system. To date, however, to provide such system wide mode names has required either full reprogramming of the radios, which is both time consuming and raises the potential for error, or that the currently programmed operating modes within a radio must be accessed by a human programmer and compared against various lists of system wide mode name aliases. Presuming that this activity is done correctly, the proper mode name alias must then be entered into the radio by the human operator. Again, the process is extremely time consuming, tedious, and subject to error in execution.

Accordingly, a need exists for an efficient, non-time consuming, relatively error free method and apparatus for providing an operating mode alias to a radio.

Summary of the Invention

These needs and others are substantially met through provision of the method and apparatus disclosed herein. Pursuant to the method of this invention, a radio can be accessed by a radio programmer, and information within the radio regarding its operating modes can be accessed. This information is then compared with data base information that relates predetermined operating modes with a predetermined mode name alias, to identify and to provide the radio with the correct mode name alias for the corresponding operating mode.

The radio can then operate thereafter to display the appropriate mode name alias when operating in the corresponding operating mode.

Table 1 comprises a mode name alias data base; and

Table 2 comprises a predetermined radio operating mode table.

BEST MODE FOR CARRYING OUT THE INVENTION

Figure 1:
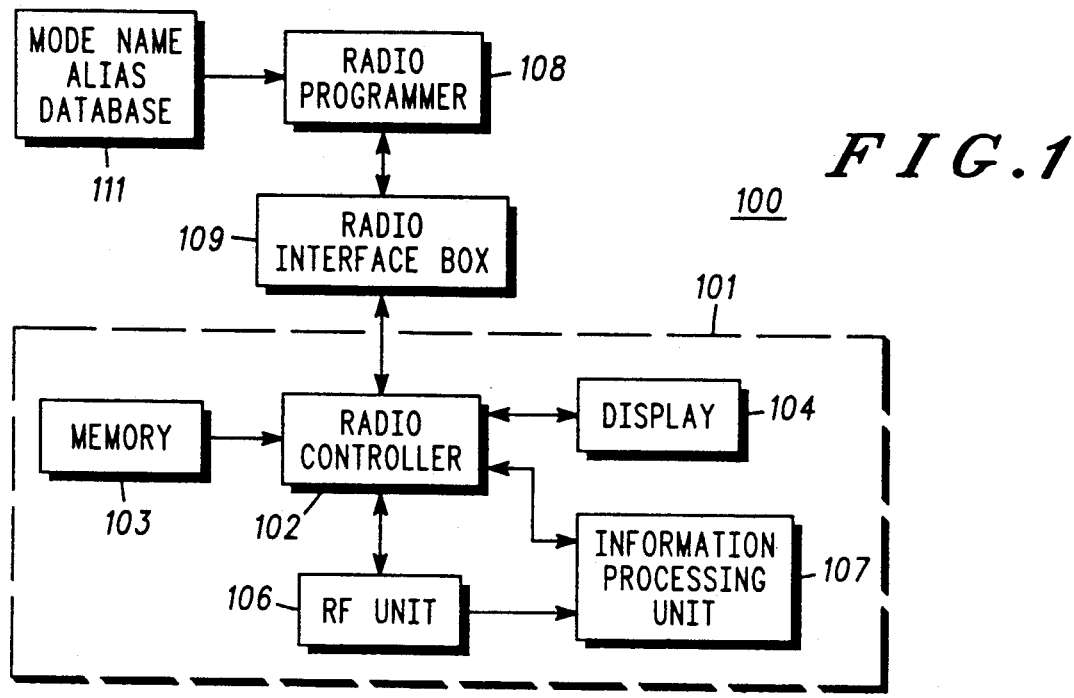
FIG. 1 comprises a block diagram depiction of a radio programmer coupled to a radio in accordance with the invention.

In FIG. 1, the invention (100) is depicted generally in conjunction with a radio (101) to be programmed. The radio (101) may be, for example a Spectra brand radio as manufactured by Motorola, Inc. Such a radio includes a radio controller (102), such as a microprocessor and associated peripheral circuitry, an RF unit (106) that supports both transmission and reception of appropriately modulated information, and an information processing unit (107) that allows received information to be properly processed. For example, in a data radio, the information processing unit (107) may include appropriate decoding apparatus. In a voice radio, the information processing unit (107) may include appropriate audio processing circuitry to allow a recovered voice message to be rendered audible. The radio (101) also includes a memory (103) wherein various operating parameters for the radio can be stored, and a display (104) that can display, amongst other things, an operating mode alias.

Each of the above generally referred to elements is well understood in the art, and hence a more detailed description will not be provided.

A radio programmer (108) such as an IBM PC can be appropriately coupled to the radio (101) through a radio interface box (109). Additional detail regarding the above referred to elements are known in the art, and further description may be found in Radio Component Replacement/Programming Device, U.S. Ser. No. 175,361, filed on Mar. 30, 1988, which reference is incorporated herein. In addition, the radio programmer (108) couples to a data base (111) wherein mode name aliases are stored in conjunction with corresponding operating parameter information.

For example, with reference to Table 1, an example (quite simplistic, for the purposes of this explanation) mode name alias data base is depicted as representative of a simple geographic partitioning of a given communication system. For example, the "Northwest" mode name alias corresponds to a transmit frequency 5, a receive frequency 4, a system ID 3, and a subfleet ID 1. Therefore, a radio operating in this mode will transmit and receive on the frequencies indicated, using the system and subfleet IDs designated. So configured, this would allow vehicles operating in the Northwest mode to communicate readily with one another, since all would be similarly configured.

In Table 2, a group of predetermined operating modes that were previously programmed into the radio (101) and stored in its memory (103) are set forth (in an extremely simplified manner to ease this description). For example, operating mode 1 in this radio provides for a transmit frequency 1, a receive frequency 12, a system ID 4, and a subfleet ID 1. Six other operating modes (operating mode 2-7) are also set forth, wherein different radio operating parameters are set forth, in addition to three unassigned modes (operating mode 8-10). In a different radio in this fleet, operating mode 1 could well have different operating parameters designated for the same general categories. Therefore, operating mode 1 will not consistently describe the same operating mode from radio to radio in a given fleet.

Figure 2:
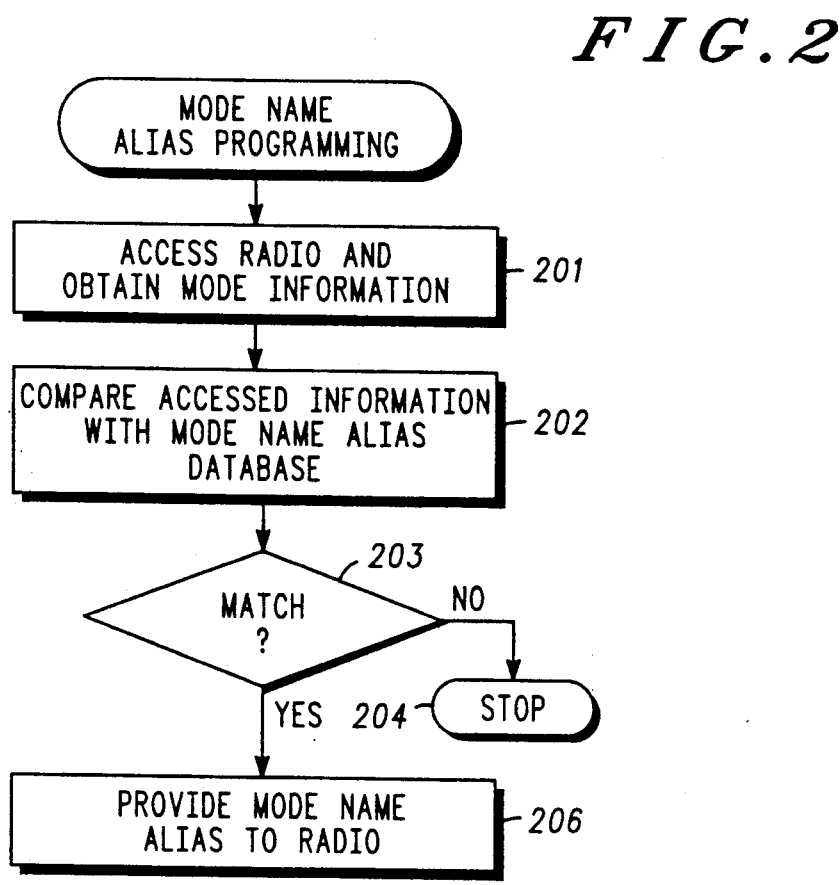
FIG. 2 comprises a flow diagram depicting operation of a radio programmer in accordance with the invention.

The mode name alias programming function (200) of the invention has been set forth in FIG. 2. The radio programmer (108) accesses the radio (101) through the radio interface box (109) that is coupled therebetween, to allow the radio programmer to access the radio (101) and obtain the mode information (201) as stored therein. For purposes of this example, it will be presumed that the predetermined operating mode information depicted in Table 2 will comprise the information recovered by the radio programmer (108).

The accessed information is then compared with the information contained in the mode name alias data base (202). For example, presuming that Table 1 represents the information in the mode name alias data base, a match (203) would be detected when comparing the information for operating mode 1 as stored in the radio (101) against the radio parameter information stored in conjunction with mode name alias "East." When such a match (203) occurs, the appropriate mode name alias (in this case, "East"), will be provided to the radio (101) (206) and stored in its memory (103). Thereafter, when operating mode 1 is selected to control operation of the radio, the display (104) for the radio will display the mode name alias "East." If no matches (203) occur, of course, the programming function will stop (204) and no mode name aliases will be provided to the radio (101).

I claim:

1. A method of reprogramming a radio, wherein the radio includes a plurality of operating modes, comprising the steps of:
   (A) coupling the radio to a radio programmer;
   (B) accessing, via the radio programmer, the radio to obtain information regarding at least some of the operating modes to provide accessed operating modes;
   (C) comparing, via the radio programmer, at least some of the accessed operating modes with a data base of predetermined operating modes, wherein at least some of the predetermined operating modes have a mode name alias associated therewith, to provide identified operating modes;
   (D) providing to the radio the mode name aliases that are associated with at least some of the identified operating modes;
   (E) storing, in the radio, the provided mode name aliases.

2. A method of programming a radio, amongst a fleet of radios, using a radio programmer, wherein at least some of the radios includes a plurality of predetermined operating modes and wherein each of the plurality of operating modes is defined, at least in part, by a plurality of predetermined radio operating parameters, comprising the steps of:
   (A) providing a data base having a plurality of mode name aliases stored therein, wherein each of the mode name aliases has associated therewith a plurality of predetermined radio operating parameters;
   (B) accessing one of the radios via the radio programmer to obtain information regarding at least one of the predetermined operating modes for that radio to provide accessed operating mode information;
   (C) comparing the accessed operating mode information with the predetermined radio operating parameters stored in the data base to identify a match between accessed operating mode information and stored predetermined radio operating parameters;
   (D) when a match is so identified, providing to the accessed radio the mode name alias that is associated with that match, such that the radio can thereafter provide that mode name alias to a user of that radio when operating in the predetermined operating mode that corresponds to that mode name alias.

3. In a programmer used to program radios, wherein the radios include:
   a plurality of predetermined operating modes and wherein each of the plurality of operating modes is defined, at least in part, by a plurality of predetermined radio operating parameters; and
   display means for displaying an operating mode alias; and wherein the programmer includes:
   coupling means for coupling to a radio to provide access to information stored in the radio regarding at least some of the predetermined operating modes;
   programming means operably coupled to the coupling means for accessing the radio to obtain information therefrom and provide information thereto;
   an improvement comprising:
   data base means for storing information comprising a plurality of mode name aliases, wherein each of the mode name aliases has associated therewith a plurality of predetermined radio operating parameters; and
   wherein the programming means further functions to compare information obtained from a radio with the predetermined radio operating parameters stored in the data base, and to provide to the radio the mode name alias that corresponds to any matched compared information, such that the radio can thereafter have the mode name alias available for display on its display means when operating in the operating mode that corresponds to that mode name alias.

* * * * *